United States Patent
Hiramatsu et al.

(10) Patent No.: US 10,836,303 B2
(45) Date of Patent: Nov. 17, 2020

(54) VEHICLE DETECTION APPARATUS AND LIGHT DISTRIBUTION CONTROL APPARATUS

(71) Applicant: Hitachi Automotive Systems, Ltd., Hitachinaka (JP)

(72) Inventors: Yoshitaka Hiramatsu, Tokyo (JP); Mayumi Suzuki, Tokyo (JP); Takeshi Nagasaki, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 186 days.

(21) Appl. No.: 16/070,142

(22) PCT Filed: Dec. 27, 2016

(86) PCT No.: PCT/JP2016/088871
§ 371 (c)(1),
(2) Date: Jul. 13, 2018

(87) PCT Pub. No.: WO2017/122535
PCT Pub. Date: Jul. 20, 2017

(65) Prior Publication Data
US 2019/0031088 A1 Jan. 31, 2019

(30) Foreign Application Priority Data
Jan. 14, 2016 (JP) ................... 2016-005063

(51) Int. Cl.
*B60Q 1/14* (2006.01)
*G06T 1/00* (2006.01)
(Continued)

(52) U.S. Cl.
CPC ............. *B60Q 1/143* (2013.01); *B60Q 1/14* (2013.01); *G06K 9/00798* (2013.01);
(Continued)

(58) Field of Classification Search
CPC . B60Q 1/143; B60Q 1/14; G06T 1/00; G08G 1/04; G08G 1/0112; G06K 9/4652;
(Continued)

(56) References Cited

U.S. PATENT DOCUMENTS 5,706,355 A * 1/1998 Raboisson ........... G05D 1/0242
345/589
7,899,213 B2 3/2011 Otsuka et al.
(Continued)

FOREIGN PATENT DOCUMENTS

JP 2005-92857 A 4/2005
JP 2009-105741 A 5/2009
(Continued)

OTHER PUBLICATIONS

International Search Report (PCT/ISA/210) issued in PCT Application No. PCT/JP2016/088871 dated Mar. 7, 2017 with English translation (four (4) pages).
(Continued)

*Primary Examiner* — Russell Frejd
(74) *Attorney, Agent, or Firm* — Crowell & Moring LLP

(57) ABSTRACT

A vehicle detection apparatus includes: a specific color region detection unit that detects a specific color region from an image photographed by a camera provided in a vehicle; a processing target range calculation unit that calculates a processing target range in which the other vehicle is detected in the image on the basis of the specific color region detected by the specific color region detection unit; and a vehicle region detection unit that detects a region of the other vehicle from the image within the processing target range calculated by the processing target range calculation unit.

10 Claims, 14 Drawing Sheets

(51) Int. Cl.
  *G06K 9/00* (2006.01)
  *G06K 9/20* (2006.01)
  *G06K 9/46* (2006.01)
  *G08G 1/01* (2006.01)
  *G08G 1/04* (2006.01)

(52) U.S. Cl.
  CPC ....... *G06K 9/00825* (2013.01); *G06K 9/2054* (2013.01); *G06K 9/4652* (2013.01); *G06T 1/00* (2013.01); *G08G 1/0112* (2013.01); *G08G 1/04* (2013.01); *G06K 9/4661* (2013.01); *G06K 2209/23* (2013.01)

(58) Field of Classification Search
  CPC ............. G06K 9/2054; G06K 9/00825; G06K 9/00798; G06K 9/4661; G06K 2209/23
  See application file for complete search history.

(56) References Cited

U.S. PATENT DOCUMENTS

| | | |
|---|---|---|
| 2009/0153664 A1 | 6/2009 | Higuchi et al. |
| 2010/0082281 A1* | 4/2010 | Nakamura .............. G06T 7/80 702/95 |
| 2014/0132769 A1* | 5/2014 | Kido .................. G06K 9/00791 348/148 |
| 2014/0348381 A1* | 11/2014 | Sano .................. G06K 9/00771 382/103 |
| 2015/0310286 A1 | 10/2015 | Nakanishi |
| 2016/0240085 A1* | 8/2016 | Otsuka ............... G06K 9/00805 |
| 2017/0267178 A1* | 9/2017 | Shiga ..................... B60R 11/02 |

FOREIGN PATENT DOCUMENTS

| | | |
|---|---|---|
| JP | 2009-146217 A | 7/2009 |
| JP | 2012-20662 A | 2/2012 |
| JP | 2015-230213 A | 12/2015 |

OTHER PUBLICATIONS

Japanese-language Written Opinion (PCT/ISA/237) issued in PCT Application No. PCT/JP2016/088871 dated Mar. 7, 2017 (four (4) pages).

Extended European Search Report issued in counterpart European Application No. 16885135.0 dated Jul. 16, 2019 (seven pages).

Japanese-language Office Action issued in counterpart Japanese Application No. 2016-005063 dated May 14, 2019 with English translation (11 pages).

* cited by examiner

VEHICLE DETECTION APPARATUS AND LIGHT DISTRIBUTION CONTROL APPARATUS

TECHNICAL FIELD

The present invention relates to a vehicle detection apparatus and a light distribution control apparatus.

BACKGROUND ART

In recent years, photographing of a front of a vehicle with a camera to detect an object located in front of an own vehicle has been performed. For example, in PTL 1, a vehicle detection apparatus that performs image analysis on all pixels only for an initial image among a plurality of images obtained in time series to determine a surrounding environment of an own vehicle, and limits a region for detecting the other vehicle for subsequent images on the basis of the determined surrounding environment, has been proposed.

CITATION LIST

Patent Literature

PTL 1: JP 2012-20662 A

SUMMARY OF INVENTION

Technical Problem

In an invention of PTL 1, since the number of pieces of data used for determining a surrounding environment is enormous, time required for analysis is prolonged, and there is a problem that other vehicles cannot be detected promptly.

Solution to Problem

A vehicle detection apparatus according to the present invention includes: a specific color region detection unit that detects a specific color region from an image photographed by a camera provided in a vehicle; a processing target range calculation unit that calculates a processing target range in which another vehicle is detected in the image on the basis of the specific color region detected in the specific color region detection unit; and a vehicle region detection unit that detects a region of the other vehicle from the image within the processing target range calculated in the processing target range calculation unit.

Advantageous Effects of Invention

According to the present invention, presence of the other vehicle can be promptly detected from a photographed image.

DESCRIPTION OF EMBODIMENTS

First Embodiment

A first embodiment of the present invention will be described below with reference to FIGS. 1 to 11.

Figure 1A:
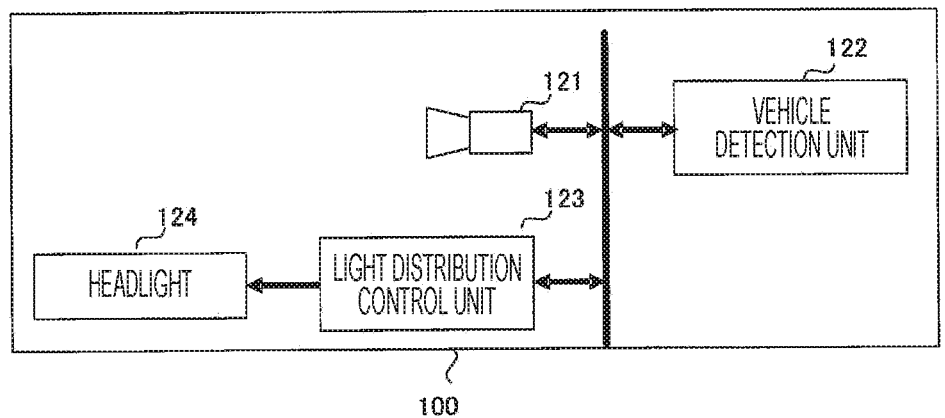
FIGS. 1A and 1B are system configuration diagrams of a vehicle according to a first embodiment, and a diagram showing a hardware configuration of a vehicle detection unit.

FIG. 1(A) is a system configuration diagram of a vehicle 100 to which a vehicle detection apparatus according to the present embodiment is applied. The vehicle 100 includes a camera 121, a vehicle detection unit 122, a light distribution control unit 123, and a headlight 124.

The camera 121 photographs a front of the vehicle 100. In the present embodiment, a vehicle in front of the vehicle 100 is detected by the camera 121 at night. Although FIG. 1(A) shows a case of one camera 121, a stereo camera may be used. Two or more cameras 121 may be provided. The vehicle detection unit 122 processes an image photographed by the camera 121 and detects a vehicle in front of the vehicle 100.

Receiving a vehicle detection result from the vehicle detection unit 122, the light distribution control unit 123 generates a control signal for controlling the headlight 124 included in the vehicle 100. Specifically, the light distribution control unit 123 generates the control signal for controlling an irradiation direction and ON/OFF of each light source composing the headlight 124 based on the vehicle detection result from the vehicle detection unit 122, and outputs the control signal to the headlight 124. As a result, light distribution of the headlight 124 is controlled with respect to other vehicles such as a preceding vehicle and an oncoming vehicle.

The headlight 124 is composed of a plurality of light sources, for example, LEDs, which can independently irradiate a plurality of light distribution regions obtained by dividing a predetermined range in front of the vehicle 100 in a horizontal direction or a vertical direction. The headlight 124 changes the light distribution by switching the irradiation direction and ON/OFF of each light source on the basis of the control signal of the light distribution control unit 123.

Figure 1B:
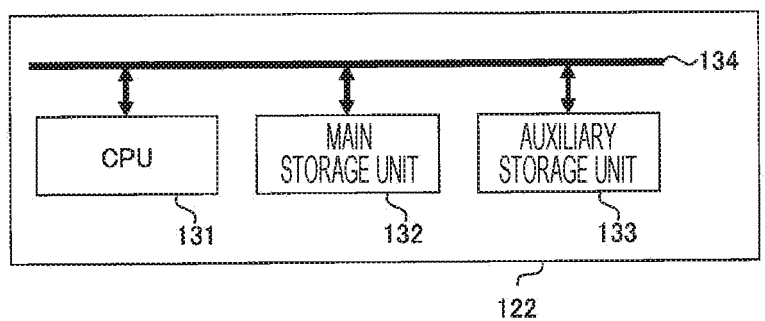

FIG. 1(B) is a diagram showing a hardware configuration of the vehicle detection unit 122. As shown in FIG. 1(B), the vehicle detection unit 122 includes a CPU 131, a main storage unit 132, an auxiliary storage unit 133, and a bus line 134. The respective units of the CPU 131, the main storage unit 132, and the auxiliary storage unit 133 are connected by the bus line 134, and mutual data transmission and reception are performed between the respective units. An auxiliary operation unit may be provided separately from the CPU 131.

The CPU 131 reads a program stored in the main storage unit 132 or the auxiliary storage unit 133, executes operation, stores an operation result in the main storage unit 132 and the auxiliary storage unit 133, and outputs a vehicle detection result to the light distribution control unit 123.

A program executed by the CPU 131, the operation results executed by the CPU 131, and setting information used by the vehicle detection unit 122 are stored in the main storage unit 132. The main storage unit 132 is composed of, for example, a random access memory (RAM) or a read only memory (ROM).

The auxiliary storage unit 133 stores the program executed by the CPU 131, the operation result executed by the CPU 131, and setting information used by the vehicle detection unit 122. The auxiliary storage unit 133 stores data and the like that cannot be stored in the main storage unit 132, and holds data even when power is cut off. The auxiliary storage unit 133 is configured by a single or a combination of a plurality of a magnetic disk unit such as a hard disk drive (HDD) or a nonvolatile memory such as a flash memory.

It should be noted that the configuration of the vehicle 100 is not limited to the above description, and the vehicle 100 may have other configurations as long as the vehicle 100 includes an imaging function and a light distribution function.

Figure 2:
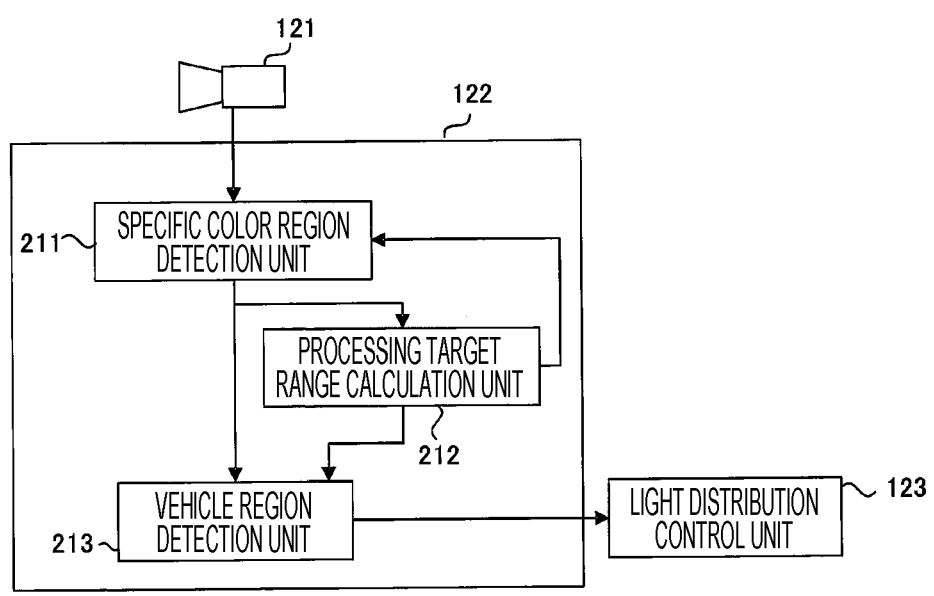
FIG. 2 is a block diagram showing a functional configuration of the vehicle detection unit.

FIG. 2 is a block diagram showing a functional configuration of the vehicle detection unit 122. The vehicle detection unit 122 includes a specific color region detection unit 211, a processing target range calculation unit 212, and a vehicle region detection unit 213. The specific color region detection unit 211, the processing target range calculation unit 212, and the vehicle region detection unit 213 are functions realized by executing a processing program stored in the main storage unit 132 or the auxiliary storage unit 133 by the CPU 131 of the vehicle detection unit 122. FIG. 2 shows the functions in a block diagram.

The specific color region detection unit 211 detects a region (hereinafter referred to as a specific color region) composed of values within a specific range on a color space, from each frame image acquired by the camera 121. In the present embodiment, from each frame image, a region composed of red that is a color of a taillight of a preceding vehicle and a region composed of red, yellow, and green that are indication colors of traffic lights are extracted as specific color regions. As an example of the color space, description will be made with a YUV color system. An image represented by the YUV color system is composed of a Y image corresponding to luminance information and U and V images having color information. Pixels having values in a specific range on a plane constituted by two dimensions of U and V are extracted, adjacent pixels are integrated, and thereby, a red region, a yellow region, and a green region are extracted.

The processing target range calculation unit 212 acquires the specific color region from the specific color region detection unit 211 and calculates the range to be used for the processing of the vehicle region detection unit 213 in the frame image based on the specific color region, as a processing target range. Although a detailed functional configuration of the processing target range calculation unit 212 will be described later, for example, a range including an oncoming lane in a frame image, or the like is calculated as the processing target range. As described later, the processing target range calculation unit 212 can calculate various ranges in the frame image as the processing target range. Therefore, when a plurality of processing target ranges are calculated, the processing target range calculation unit 212 sets a priority order of processing of the vehicle region detection unit 213 for each processing target range.

The vehicle region detection unit 213 acquires the processing target range from the processing target range calculation unit 212 and detects a headlight of the other vehicle from the frame image within the processing target range in accordance with a predetermined algorithm, to detect a vehicle region corresponding to the region of the other vehicle. When the processing target range calculation unit 212 calculates a plurality of processing target ranges in the frame image as described above, the vehicle region detection unit 213 selects the processing target range in accordance with the priority order of processing determined for each acquired processing target range, and detects the vehicle region from the frame image within the selected processing target range. In a method generally known as a method of detecting a headlight of the other vehicle, first, a pixel having a luminance value greater than or equal to a predetermined threshold is extracted from the frame image, adjacent pixels among the extracted pixels are integrated, and a high luminance region is generated. Next, whether the generated high luminance region corresponds to the headlight of the vehicle is determined, and a rectangular region surrounding the high luminance region or a high luminance region group determined to be corresponding to the headlight is set to be the vehicle region. It should be noted that other methods may be used to detect the headlight of the other vehicle.

Since appearance of the headlight of the other vehicle differs depending on a positional relationship with the own vehicle, the detection algorithm may be changed depending on a position in the image. For example, when the vehicle region corresponding to the headlight of the other vehicle traveling in the oncoming lane is detected, the other high luminance region having similar size and shape is found in the left or right of the generated high luminance region, the generated high luminance region and the other high luminance region are made to be a pair, and the rectangular region surrounding the pair is set to be the vehicle region. On the other hand, when the vehicle region corresponding to the headlight of the other vehicle that exists in the opposite side of the oncoming lane with respect to a traveling road of the own vehicle is detected, the other high luminance region having a similar shape is found in an oblique direction of the generated high luminance region, the generated high luminance region and the other high luminance region are made to be a pair, and the rectangular region surrounding the pair is set to be the vehicle region. When a vehicle region corresponding to the headlight of the other vehicle that exists on a road intersecting with the traveling road of the own vehicle is detected, whether it is a headlight from the size and shape of the generated high luminance region is determined, and the high luminance region determined to be the headlight is set to be the vehicle region. Further, in the processing target range calculation unit 212, when there is the pair of specific color regions determined to be the taillight of the vehicle as described later, the rectangular region surrounding the pair is also set to be the vehicle region.

Figure 3:
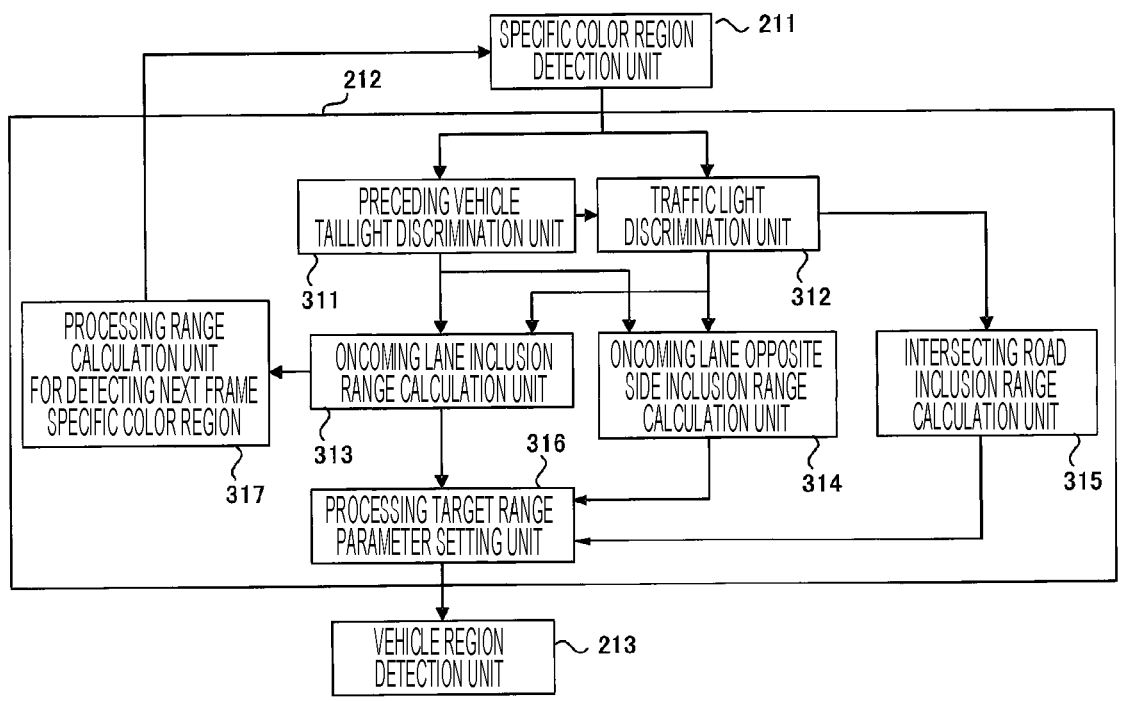
FIG. 3 is a block diagram showing a functional configuration of a processing target range calculation unit.

FIG. 3 is a block diagram showing a functional configuration of the processing target range calculation unit 212. The processing target range calculation unit 212 includes a preceding vehicle taillight discrimination unit 311, a traffic light discrimination unit 312, an oncoming lane inclusion range calculation unit 313, an oncoming lane opposite side inclusion range calculation unit 314, an intersecting road inclusion range calculation unit 315, a processing target range parameter setting unit 316, and a processing range calculation unit for detecting a next frame specific color region 317.

The preceding vehicle taillight discrimination unit 311 acquires the red region extracted as the specific color region from the specific color region detection unit 211, discriminates the one corresponding to the taillight of the preceding vehicle from the acquired red region, and outputs the region that has been discriminated to be the taillight of the preceding vehicle as the preceding vehicle taillight region.

Figure 4:
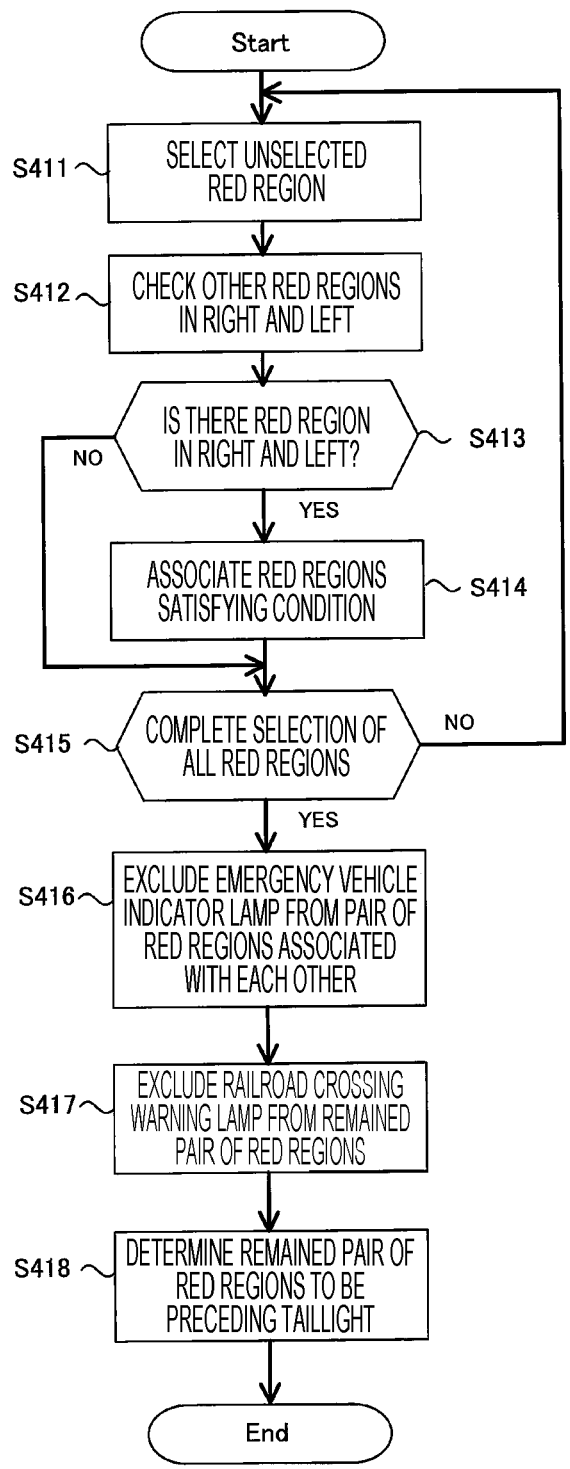
FIG. 4 is a flowchart showing operation of a preceding vehicle taillight discrimination unit.

FIG. 4 is a flowchart showing the operation of discriminating the taillight of the preceding vehicle from the red region by the preceding vehicle taillight discrimination unit 311. The preceding vehicle taillight discrimination unit 311 extracts and selects a region that has never been selected from the red region group in the specific color region output from the specific color region detection unit 211 in step S411 of FIG. 4. Then, in step S412, in the selected red region, whether the other red region exists within a predetermined range spreading to the left and right centered on the selected red region is checked.

In step S413, whether the other red region exists within a predetermined range spreading to the left and right is determined. When there is the other red region within the predetermined range spreading to the left and right, in step S414, the red region that is paired with the red region selected in step S411 is selected on the basis of three viewpoints of a positional relationship, a distance between the regions, and the sameness of the size of the region from the existing red region, and these red regions are associated with each other. In step S413, when the other red region does not exist within the predetermined range spreading to the left and right, the process proceeds to step S415. In step S415, whether the selection is completed for all the red regions is determined. In this determination, when there is a red region for which the selection has not completed, the process returns to step S411.

In step S415, when selection for all the red regions is completed, the process proceeds to step S416. In step S416, a pair of red regions associated with each other is found, and whether the found pair corresponds to an emergency indicator lamp of an emergency vehicle is determined. When it is determined to be the emergency indicator lamp, the found pair is excluded from the subsequent processing targets. More specifically, the presence of two high luminance regions corresponding to a headlight or a taillight is determined within a predetermined range in a lower side of the found pair, and when two high luminance regions are found, it is determined that the pair is an emergency indicator lamp of the emergency vehicle, and the pair is excluded from the processing target. Subsequently, in step S417, it is discriminated whether the pair of red regions that has not been determined to be the emergency indicator lamp corresponds to a railroad crossing warning lamp. When being determined to be the railroad crossing warning lamp, the pair is excluded from the subsequent processing target. Specifically, whether the pair is the railroad crossing warning lamp is discriminated based on the shape and position of each region of the red region pair and the distance between the regions. Also, in step S417, map information not shown may be acquired, and discrimination processing of the railroad crossing warning lamp may be performed only when there is a railroad crossing ahead. Finally, in step S418, the pair of red regions that has not been determined to be the railroad crossing warning lamp in step S417 is determined to be the taillight of the preceding vehicle. In step S418, the emergency indicator lamp of the emergency vehicle is excluded (step S416), the railroad crossing warning lamp is further excluded (step S417), and the remaining red region pair is determined to be the taillight of the preceding vehicle.

Figure 5C:
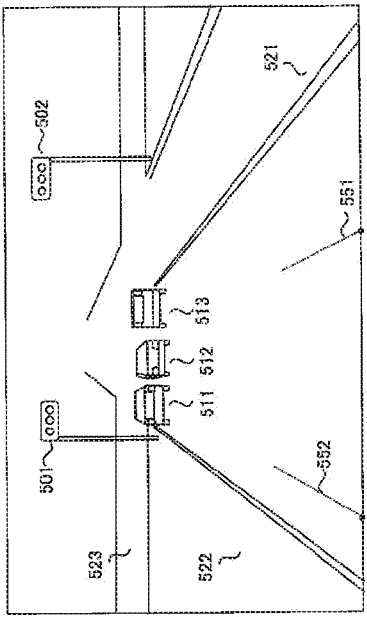
FIGS. 5A to 5C are diagrams showing photographed images and specific color regions.
Figure 5A:
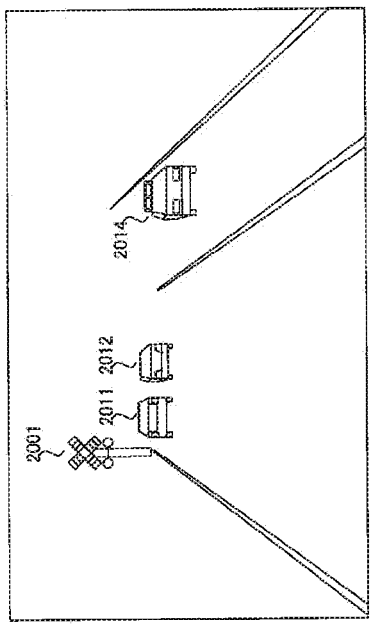
Figure 5B:
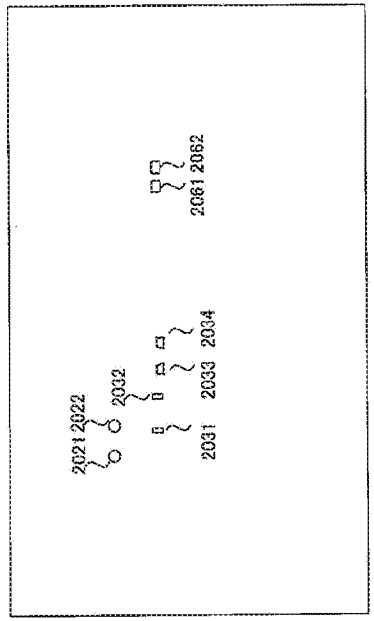

FIG. 5(A) is a diagram showing an image photographed in a situation in which one emergency vehicle 2014 exists in the oncoming lane, a railroad crossing warning device 2001 exists at the front, and two preceding vehicles 2011 and 2012 exist ahead, while the own vehicle is traveling in the left lane. FIG. 5(B) is a diagram showing a detection result of a specific color region with respect to the image shown in FIG. 5(A). When two emergency indicator lamps are arranged in a horizontal direction like the emergency vehicle 2014, these emergency indicator lamps are detected as two specific color regions 2061 and 2062 arranged horizontally, as a result of the specific color detection. Thus, such emergency indicator lamps are likely to be discriminated mistakenly to be the taillight of the vehicle. Therefore, it is necessary to exclude the specific color regions 2061 and 2062 from the preceding vehicle taillight region by performing the processing of step S416 in FIG. 4. In the case where two railroad crossing warning lamps are arranged in the horizontal direction as in the railroad crossing warning device 2001, as a result of the specific color detection, these are detected as two specific color regions 2021 and 2022 horizontally arranged, and are likely to be discriminated mistakenly to be the taillight of the vehicle. Therefore, it is necessary to exclude the specific color regions 2021 and 2022 from the preceding vehicle taillight region by performing the processing of step S417 in FIG. 4. As a result, the preceding vehicle taillight discrimination unit 311 can discriminate between the pair of the specific color regions 2031 and 2032 corresponding to the taillight of the preceding vehicle 2011 and the pair of the specific color regions 2033 and 2034 corresponding to the taillight of the preceding vehicle 2012, as the preceding vehicle taillight region.

Description returns to the description of the processing target range calculation unit 212 in FIG. 3. The traffic light discrimination unit 312 first acquires the red region, the yellow region, and the green region extracted as the specific color regions from the specific color region detection unit 211, and the taillight region from the preceding vehicle taillight discrimination unit 311. A region corresponding to the indicator lamp of the traffic light is discriminated from the red region, the yellow region, the green region acquired from the specific color region detection unit 211, and the taillight region acquired from the preceding vehicle taillight discrimination unit 311, and the region that has discriminated to be corresponding to the indicator lamp of the traffic light is output as the traffic light region. When a pair of red regions corresponding to the railroad crossing warning lamp is detected in the preceding vehicle taillight discrimination unit 311 in step S417 of the operation flowchart of FIG. 4, the detected region may be taken as the traffic light region in the traffic light discrimination unit 312.

The oncoming lane inclusion range calculation unit 313 acquires the preceding vehicle taillight region from the preceding vehicle taillight discrimination unit 311 and the traffic light region from the traffic light discrimination unit 312, and calculates the range including the oncoming lane based on the acquired preceding vehicle taillight region and the traffic light region. Calculation of the range including the oncoming lane will be described below with reference to FIG. 5(C).

FIG. 5(C) is a diagram showing an image photographed in a situation in which two traffic lights (501 and 502) and three vehicles (511, 512, and 513), and an intersecting road 523 exist at the front, while the own vehicle is traveling in the left lane. In the case of a left-hand traffic, under such situation, since the oncoming lane 521 generally exists on the right side of the preceding vehicle, the oncoming lane inclusion range calculation unit 313 calculates a range including the oncoming lane 521 in the right side of the taillight region of the preceding vehicle 513 that exists in the rightmost side within the image. Since the oncoming lane 521 is highly likely to exist in a lower side of the traffic light, the range including the oncoming lane 521 in the lower side of the region of the traffic light 501 located at the lowermost position in the image is calculated. When a straight line 551 obtained by extending forward a right boundary of the own vehicle in the image can be set, the range including the oncoming lane 521 in a right side of the straight line 551 is calculated.

The oncoming lane opposite side inclusion range calculation unit 314 shown in FIG. 3 acquires the preceding vehicle taillight region from the preceding vehicle taillight discrimination unit 311 and the traffic light region from the traffic light discrimination unit 312, and calculates the range including a place outside the traveling road (hereinafter, referred to as an oncoming lane opposite side place) that is in the opposite side of the oncoming lane with respect to the traveling road of the own vehicle, on the basis of the acquired preceding vehicle taillight region and the traffic light region.

Calculation of the range by the oncoming lane opposite side inclusion range calculation unit 314 will be described below with reference to FIG. 5(C). In the case of the left-hand traffic, since the oncoming lane opposite side place 522 exists in the left side of the preceding car, the range including the oncoming lane opposite side place 522 in the left side of the taillight region of the preceding car 511 that exists in the leftmost side is calculated. Since the oncoming lane opposite side place 522 is highly likely to exist in the lower side of the traffic light, the range including the oncoming lane opposite side place 522 in the lower side of the region of the lowermost traffic light 501 in the image is calculated. When a straight line 552 obtained by extending forward a left boundary of the own vehicle in the image can be set, the range including the oncoming lane opposite side place 522 in a left side of the straight line 552 is calculated.

The intersecting road inclusion range calculation unit 315 shown in FIG. 3 acquires the preceding vehicle taillight region from the preceding vehicle taillight discrimination unit 311 and the traffic light region from the traffic light discrimination unit 312, and calculates the range including a road intersecting at the front with the traveling road of the own vehicle is calculated based on the acquired preceding vehicle taillight region and the traffic light region.

Calculation of the range by the intersecting road inclusion range calculation unit 315 will be described below with reference to FIG. 5(C). When there is a traffic light at the front, there is a possibility that an intersecting road 523 intersecting at the front with the traveling road of the own vehicle exists in the lower side of the traffic light. Therefore, a range including the intersecting road 523 in the lower side of the region of the traffic light 501 located at the lowermost position in the image is calculated. When the preceding vehicle exists at the front, there is a high possibility that the intersecting road 523 exists in an upper side from a lower end of the preceding vehicle. Therefore, a range including the intersecting road 523 in the upper side from a position lower than the position of the taillight region of the lowermost preceding vehicle 512 in the image by a predetermined value is calculated.

The processing target range parameter setting unit 316 shown in FIG. 3 acquires the range including the oncoming lane from the oncoming lane inclusion range calculation unit 313, acquires the range including the oncoming lane opposite side place from the oncoming lane opposite side inclusion range calculation unit 314, and acquires the range including the intersecting road at the front from the intersecting road inclusion range calculation unit 315. Then, each acquired range is set to be a processing target range, a priority order to be processed in the vehicle region detection unit 213 and a vehicle detection algorithm to be applied are set for each processing target range, and the settings are output to the vehicle region detection unit 213. The priority order to be processed in the vehicle region detection unit 213 can be set to a higher priority order, for example, in an order of the range including the oncoming lane, the range including the intersecting road at the front, and the range including the oncoming lane opposite side place. Otherwise, other priority orders can be set.

The processing range calculation unit for detecting a next frame specific color region 317 shown in FIG. 3 acquires the range including the oncoming lane from the oncoming lane inclusion range calculation unit 313, and calculates the range excluding the range including the acquired oncoming lane as the target range in which the specific color region detection unit 211 detects the specific color region in the next frame image. That is, as described above, in the specific color region detection unit 211, the preceding vehicle taillight region and the traffic light region used when the oncoming lane inclusion range calculation unit 313 calculates the range including the oncoming lane, needs to be extracted from the next frame image as the specific color region. Even in the next frame image, these specific color regions are highly likely to exist in a range outside the range including the oncoming lane calculated by the oncoming lane inclusion range calculation unit 313 in the current frame image. Therefore, a range excluding the range including the oncoming lane calculated in the current frame image can be calculated as the detection target range of the specific color region for the next frame image.

Figure 6:
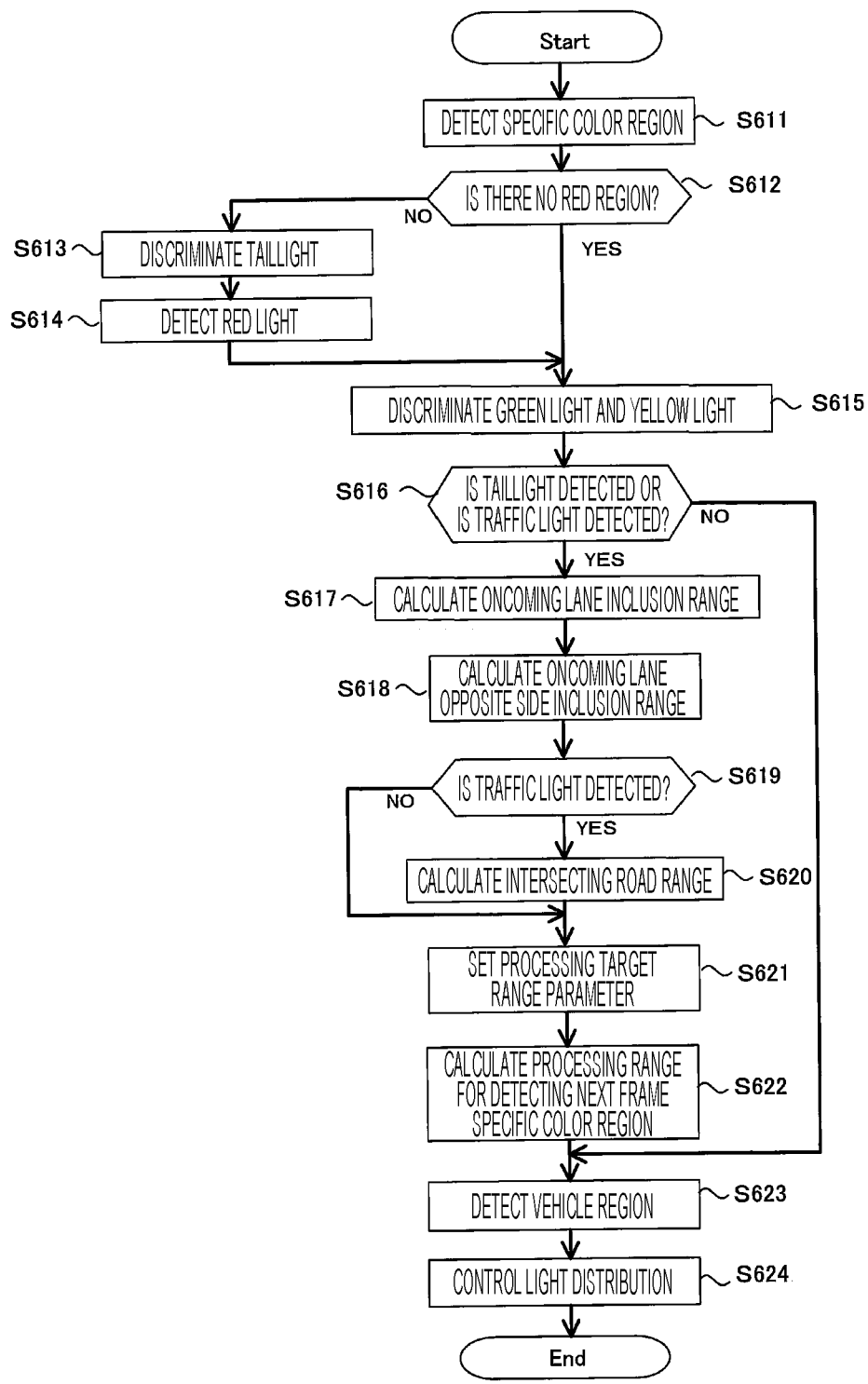
FIG. 6 is a flowchart showing operation of the vehicle detection unit.

FIG. 6 is a flowchart showing a process flow of the vehicle detection unit 122, in other words, an operation in which the vehicle 100 detects the other vehicle. This flowchart will be described with reference to the drawings of FIGS. 7(A) to (D) showing the photographed images and the detection result of the specific color region.

In step S611 of FIG. 6, the specific color region detection unit 211 shown in FIG. 3 detects, from the frame image acquired by the camera 121, a specific color region group including the red region corresponding to the taillight of the preceding vehicle, and the region composed of red, yellow, and green that are indication colors of the traffic light. In step S612, whether the detected specific color region group has a red color region is determined. When there is no red color region, the process proceeds to step S615. In step S612, when there is a red region in the region group, the processing proceeds to step S613. In step S613, the preceding vehicle taillight discrimination unit 311 shown in FIG. 3 discriminates the region corresponding to the taillight of the preceding vehicle and the other regions from the red region group, according to the flowchart shown in FIG. 4.

Figure 7C:
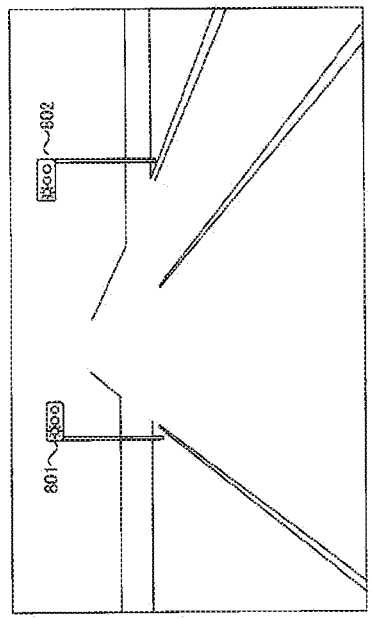
FIGS. 7A to 7D are diagrams showing photographed images, specific color regions, and detection ranges.
Figure 7D:
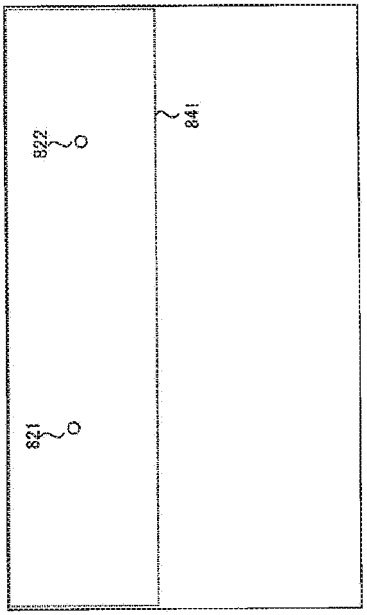
Figure 7A:
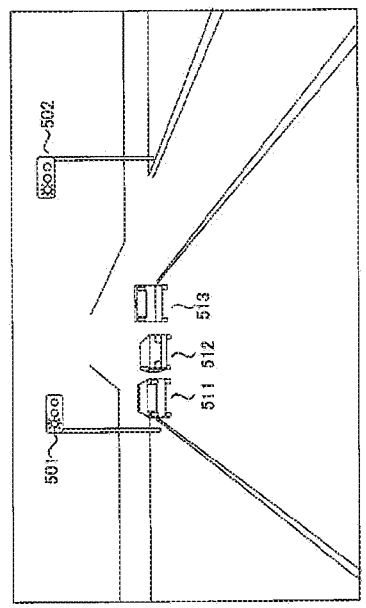
Figure 7B:
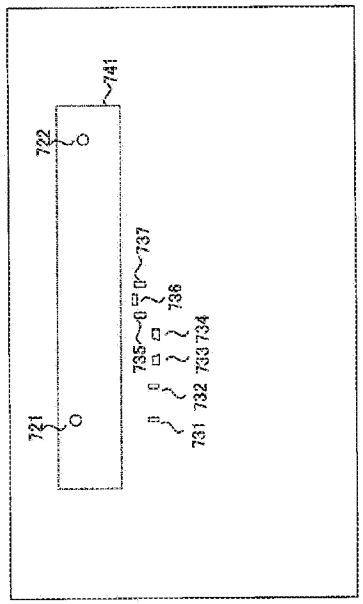

FIG. 7(A) is a diagram showing an image photographed in a situation in which red indicator lamps of the traffic lights 501 and 502 are lit. FIG. 7(B) is a diagram showing a result of processing of step S613 for the red regions 721, 722, 731, 732, 733, 734, 735, 736, and 737 detected as specific color regions in step S611, with respect to the image shown in FIG. 7(A). After step S613 is performed, as shown in FIG. 7(B), a pair of the red region 731 and the red region 732, a pair of the red region 733 and the red region 734, and a pair of the red region 735 and the red region 737 are discriminated as the preceding vehicle taillight regions, and the red regions 721, 722, and 736 are discriminated as other than the preceding vehicle taillight.

In step S614, the traffic light discrimination unit 312 shown in FIG. 3 detects the region corresponding to the red light, that is, the red indicator lamp of the traffic light, and the other regions, for the red region discriminated to be other than the preceding vehicle taillight. In the detection method, when the preceding vehicle taillight region is detected in step S613, among the red regions included in the predetermined range in the upper side of the uppermost region of the detected preceding vehicle taillight regions, the region having a circular shape is detected as the red indicator lamp. In FIG. 7(B), the preceding vehicle taillight region at the uppermost part in the image is the pair of the red regions 735 and 737, and the red regions 721 and 722 included in the upper region 741 are both circular. Therefore, the red regions 721 and 722 are detected as the red indicator lamps of the traffic light.

When the preceding vehicle taillight region is not detected in step S613, among the red regions included in the predetermined range in the upper side of the image, the region having a circular shape is detected as a red light.

FIG. 7(C) is a diagram showing an image photographed in a situation in which two traffic lights (501 and 502) of which the red indicator lamps are lit and an intersecting road exist at the front, while the own vehicle is traveling in the left lane. FIG. 7(D) is a diagram showing the result of processing of step S613 for the red regions 821 and 822 detected as the specific color region in step S611, with respect to the image shown in FIG. 7(C). For the image shown in FIG. 7(D), even when step S613 is performed, the preceding vehicle taillight region is not detected. In this case, since a predetermined range 841 in the upper side of the image is set, and the shapes of the red regions 821 and 822 included in the range 841 are both circular, the red regions 821 and 822 are discriminated as the red indicator lamps.

Description returns to the description of FIG. 6. In step S615, the traffic light discrimination unit 312 shown in FIG. 3 discriminates the region corresponding to the yellow indicator lamp of the traffic light and the other regions, for the yellow region group detected in step S611. In step S615, the region corresponding to the green indicator lamp and the other regions are discriminated, for the green region group detected in step S611. Discrimination between the yellow indicator lamp and the green indicator lamp is performed with the detected position, size and shape as feature quantities.

In step S616, when neither the region corresponding to the preceding vehicle taillight in step S613 nor the region corresponding to the indicator lamp of the traffic light in step S614 and step S615 is detected, the process proceeds to step S623. In this case, in step S623, the vehicle region is detected with the entire range of the image as the processing target range. In step S616, when either or both of the region corresponding to the taillight in step S613 or the region corresponding to the indicator lamp of the traffic light in step S614 and step S615 is detected, the process proceeds to step S617. In step S617, the oncoming lane inclusion range calculation unit 313 calculates the range including the oncoming lane by the method as described in FIG. 5(C) on the basis of the preceding vehicle taillight region detected in step S613 and the traffic light regions detected in step S614 and step S615. Another example of the calculation result of the range including the oncoming lane will be further described below with reference to FIGS. 8 and 9.

Figure 8C:
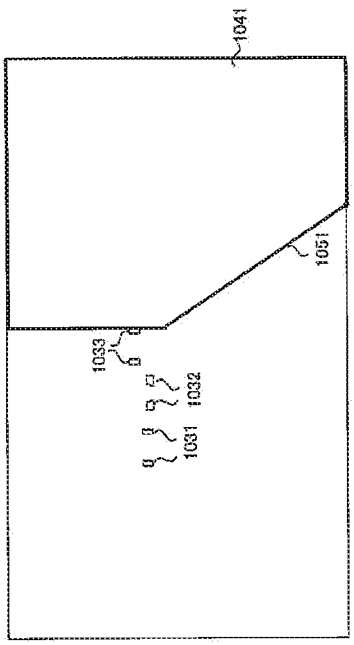
FIGS. 8A to 8C are diagrams showing a range including an oncoming lane, a photographed image in which a preceding vehicle exists, and a range including the oncoming lane.
Figure 8A:
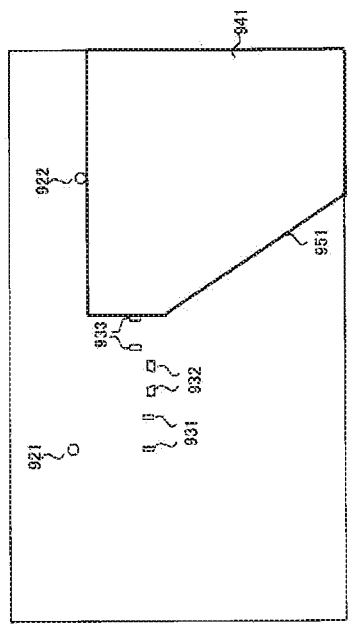

FIG. 8(A) is a diagram showing a range 941 including the oncoming lane calculated on the basis of taillight region pairs 931, 932, and 933 of the three preceding vehicles and the two traffic light regions 921 and 922, discriminated from the image of FIG. 7(B). In this way, when both the preceding vehicle taillight region pairs 931, 932, and 933 and the traffic light regions 921 and 922 are detected, the range 941 that covers a right side of the preceding vehicle taillight region pair 933 existing in the rightmost side within the image among the preceding vehicle taillight region pairs 931, 932, and 933, a lower side of the traffic light region 922 located at the lowermost side within the image of the traffic light regions 921 and 922, and the right side of the straight line 951 obtained by extending forward a right side boundary of the own vehicle in the image, is taken as the range including the oncoming lane.

Figure 8B:
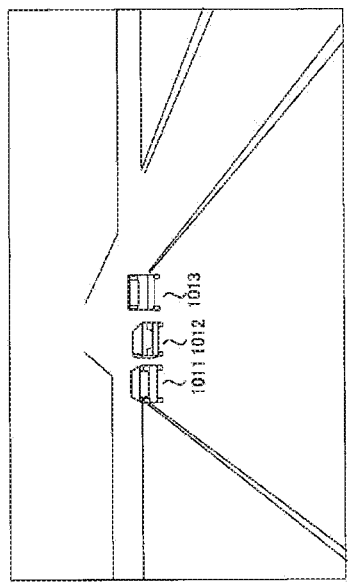

FIG. 8(B) is a diagram showing an image photographed in a situation in which three vehicles (1011, 1012, and 1013) of the preceding vehicle exist while the own vehicle is traveling in the left lane. FIG. 8(C) is a diagram showing the taillight region pairs 1031, 1032, and 1033 of the three preceding vehicles detected from the image shown in FIG. 8(B), and a range 1041 including the oncoming lane calculated on the basis of taillight region pairs 1031, 1032, and 1033 of the preceding vehicles. As described above, when only the preceding vehicle taillight region pairs 1031, 1032, and 1033 are detected and the traffic light region is not detected, the range 1041 that covers a right side of the preceding vehicle taillight region pair 1033 existing in the rightmost side within the image among the preceding vehicle taillight region pairs 1031, 1032, and 1033, and a right side of the straight line 1051 obtained by extending forward a right side boundary of the own vehicle in the image, is set to be the range including the oncoming lane.

Figure 9A:
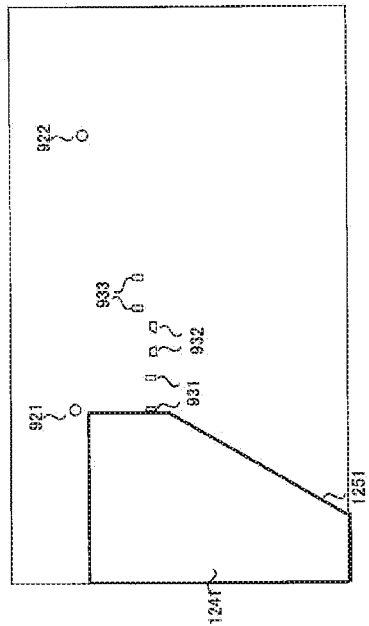
FIGS. 9A to 9C are diagrams showing a photographed image in which a traffic light exists, a range including the oncoming lane, and a range including an oncoming lane opposite side place.
Figure 9B:
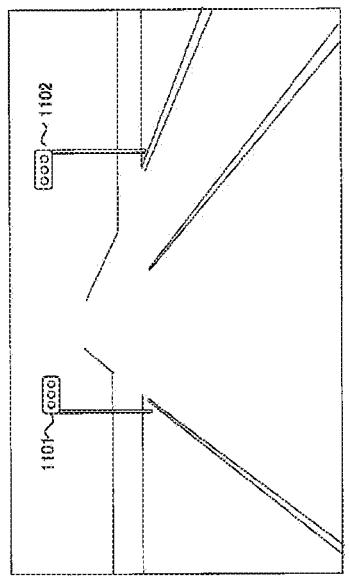

FIG. 9(A) is a diagram showing an image photographed in a situation where the two traffic lights (1101 and 1102) exist while the own vehicle is traveling in the left lane. FIG. 9(B) is a diagram showing two traffic light regions 1121 and 1122 detected from the image shown in FIG. 9(A), and a range 1141 including the oncoming lane calculated on the basis of the traffic light regions 1121 and 1122. As described above, when only the traffic light regions 1121 and 1122 are detected, and the preceding vehicle taillight region pair is not detected, a range 1141 that covers a lower side of the traffic light region 1122 located at the lowermost side within the image of the traffic light regions 1121 and 1122, a right side of the traffic light region 1121 located in a left side from a center within the image, and a right side of the straight line 1152 connecting a position 1150 having a predetermined length downward from a right end of the traffic light region 1121 located in the left side from the center within the image, and a right side boundary position 1151 of the own vehicle of the lower end of the image, is set to be a range including the oncoming lane. When there is no traffic light region in the left side from the center within the image, the lower side of the traffic light region 1122 located at the lowermost position within the image is set to be the range including the oncoming lane.

Description returns to the description of FIG. 6. In step S618, the oncoming lane opposite side inclusion range calculation unit 314 calculates the range including the oncoming lane opposite side place located in the opposite side of the oncoming lane with respect to the traveling road of the own vehicle on the basis of the preceding vehicle taillight region detected in step S613 and the traffic light regions detected in step S614 and step S615. An example of the calculation result of the range including the oncoming lane opposite side place will be described with reference to FIGS. 9(C) to 10(B).

Figure 9C:
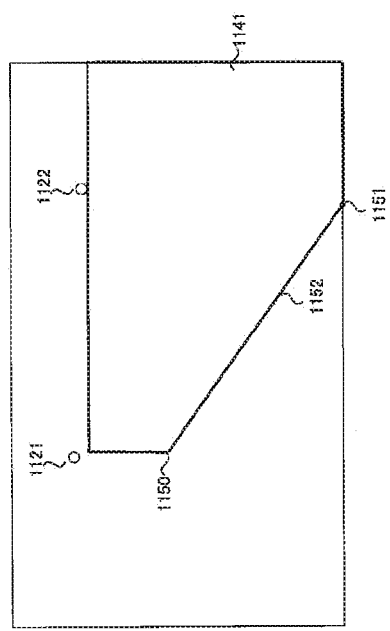

FIG. 9(C) is a diagram showing a range 1241 including the oncoming lane opposite side place calculated on the basis of taillight region pairs 931, 932, and 933 of the three preceding vehicles, and the two traffic light regions 921 and 922, shown in FIG. 8(A). In this way, when both the preceding vehicle taillight region pairs 931, 932, and 933 and the traffic light regions 921 and 922 are detected, the range 1241 that covers a left side of the preceding vehicle taillight region pair 931 existing in the leftmost side among the preceding vehicle taillight region pairs 931, 932, and 933, a lower side of the traffic light region 922 located at the lowermost side within the image among the traffic light regions 921 and 922, and the left side of the straight line 1251 obtained by extending forward a left side boundary of the own vehicle in the image, is set to be the range including the oncoming lane opposite side place.

Figure 10A:
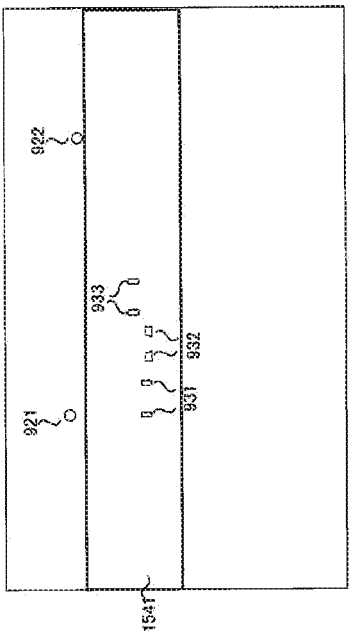
FIGS. 10A to 10D are diagrams showing ranges including the oncoming lane opposite side place and ranges including intersecting roads.
Figure 10B:
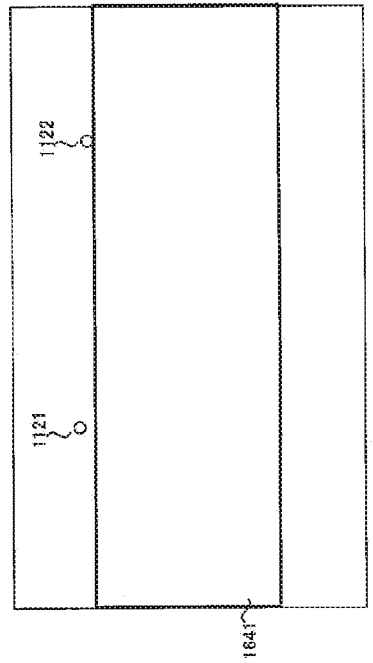

FIG. 10(A) is a diagram showing a range 1341 including the oncoming lane opposite side place calculated on the basis of taillight region pairs 1031, 1032, and 1033 of the three preceding vehicles, shown in FIG. 8(C). As described above, when only the preceding vehicle taillight region pairs 1031, 1032, and 1033 are detected and the traffic light region is not detected, the range 1341 that covers a left side of the preceding vehicle taillight region pair 1031 existing in the leftmost side among the preceding vehicle taillight region pairs 1031, 1032, and 1033, and a left side of the straight line 1351 obtained by extending forward a left side boundary of the own vehicle in the image, is set to be the range including the oncoming lane opposite side place.

FIG. 10 (B) is a diagram showing a range 1441 including the opposite side of the oncoming lane calculated based on the two traffic light regions 1121 and 1122 shown in FIG. 9(B). As described above, when only the traffic light regions 1121 and 1122 are detected, and the preceding vehicle taillight region pair is not detected, a range 1441 that covers a lower side of the traffic light region 1122 located at the lowermost side within the image of the traffic light regions 1121 and 1122, and a left side of the straight line 1452 connecting a position 1450 having a predetermined length downward from a left end of the traffic light region 1121 located in the left side from the center within the image, and a left side boundary position 1451 of the own vehicle of the lower end of the image, is set to be a range including the oncoming lane opposite side place. When there is no traffic light region in the left side from the center in the image, the range including the oncoming lane opposite side place is not set.

Description returns to the description of FIG. 6. In step S619, in steps S614 and S615, whether a region corresponding to the indicator lamp of the traffic light is detected is discriminated. When a region corresponding to the indicator lamp of the traffic light is detected, in step S620, the intersecting road inclusion range calculation unit 315 calculates a range including the road intersecting at the front, on the basis of the preceding vehicle taillight region detected in step S613 and the traffic light regions detected in step S614 and step S615. When a region corresponding to the indicator lamp of the traffic light is not detected in step S619, the process proceeds to step S621.

Figure 10C:
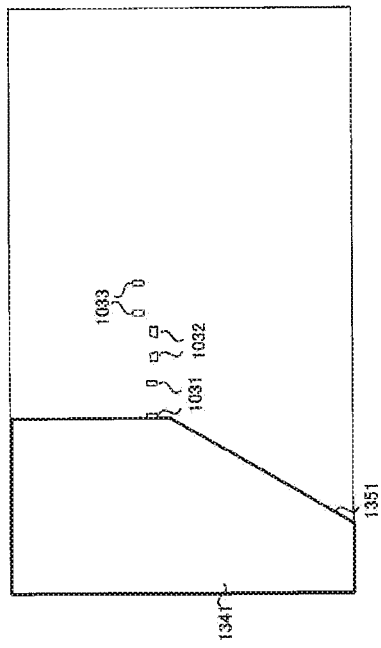

An example of a calculation result of a range including a road intersecting at the front will be described with reference to FIG. 10(C) to FIG. 10(D). FIG. 10(C) is a diagram showing a range 1541 including the road intersecting at the front calculated on the basis of the taillight region pairs 931, 932, and 933 of the three preceding vehicles, and the two traffic light regions 921 and 922, shown in FIG. 8(A). In this way, when both the preceding vehicle taillight region pairs 931, 932, and 933 and the traffic light regions 921 and 922 are detected, the range 1541 that covers a lower side of the traffic light region 922 located at the lowermost side within the image among the traffic light regions 921 and 922, and an upper side from a position lower than the position of the preceding vehicle taillight region pair 932 located at the lowermost side within the image among the preceding vehicle taillight region pairs 931, 932, and 933 by a predetermined value, is set to be the range 1541 including the intersecting road.

Figure 10D:
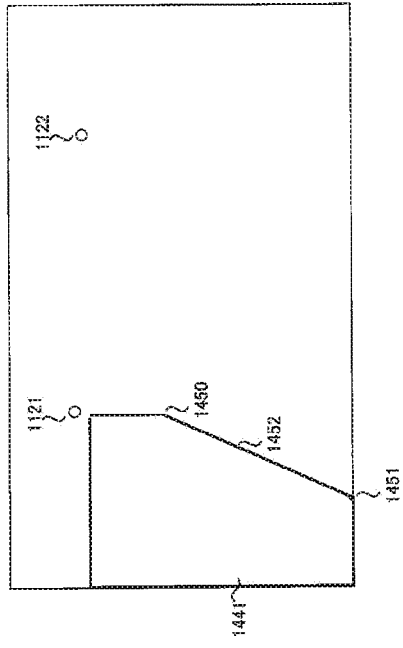

FIG. 10(D) is a diagram showing a range 1641 including a road intersecting at the front calculated based on the two traffic light regions 1121 and 1122 shown in FIG. 9(B). In this way, when only the traffic light regions 1121 and 1122 are detected, and the preceding vehicle taillight region pair is not detected, of the traffic light regions 1121 and 1122, the range 1641 that covers a predetermined size of a lower side of the traffic light region 1122 located at the lowermost side within the image is set to be a range including the intersecting road.

Description returns to the description of FIG. 6. In step S621, the processing target range parameter setting unit 316 sets the range including the oncoming lane calculated in step S617, the range including the oncoming lane opposite side place calculated in step S618, and the range including the forward intersecting road calculated in step S620 as the processing target ranges, and sets a priority order to be processed and a vehicle detection algorithm to be applied for each processing target range. The priority order to be processed is, for example, as described above, in an order of the range including the oncoming lane, the range including the forward intersecting road, and the range including the oncoming lane opposite side place. When the size of the range including the oncoming lane is larger than the predetermined threshold, the range including the forward intersecting road and the range including the oncoming lane opposite side place may be excluded from the processing target range. Thus, the vehicle detection processing is limited only to the range including the oncoming lane, and the time required for the vehicle detection processing can be suppressed. As a result, detection of the oncoming vehicle that operates real time and is important for light distribution control can be realized. A detection algorithm of the vehicle region detection unit 213 is set in correspondence with each range.

Figure 11A:
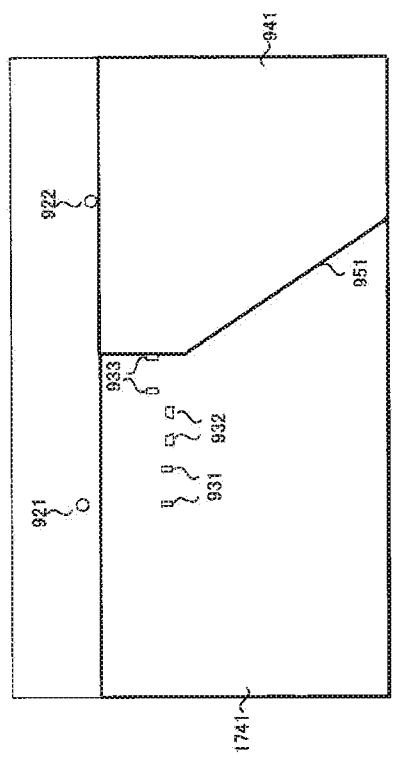
FIGS. 11A and 11B are diagrams showing ranges to be processed in a next frame image and images photographed in which a vehicle exists on the opposite side of the oncoming lane.

In step S622 of FIG. 6, the processing range calculation unit for detecting a next frame specific color region 317 calculates the range of the next frame image to be processed by the specific color region detection unit 211. This range is calculated based on the range including the oncoming lane calculated in step S617. FIG. 11(A) is a diagram showing an example of a range 1741 processed by the specific color region detection unit 211 in the next frame image, calculated based on the range 941 including the oncoming lane shown in FIG. 8(A). In this way, the range 1741 in the left side excluding the range 941 including the oncoming lane is set to be the range to be processed by the specific color region detection unit 211 in the next frame image. At the processing timing of the next frame image, the specific color region detection unit 211 detects a region composed of red, yellow, and green that are indication colors of the traffic light, with respect to the range 1741 of the next frame image. A range including the traffic light regions 921 and 922 in the upper side of the ranges 941 and 1741 may be further included in the processing target range of the specific color region detection unit 211 in the next frame image.

Description returns to the description of FIG. 6. In step S623, the vehicle region detection unit 213 detects the headlight of the other vehicle from the processing target range set in step S621 according to the determined algorithm, and detects the vehicle region. That is, the vehicle region of the other vehicle is detected based on a high luminance region within the processing target range. More specifically, the vehicle region detection unit 213 acquires the processing target range group calculated in step S621, selects a processing target range in accordance with the priority order of processing determined for the acquired processing target range group, and detects the vehicle region. In step S613, a region pair that has discriminated as the taillight of the preceding vehicle is detected as a vehicle region. In next step S624, the light distribution control unit 123 controls the light distribution of the headlight 124 so that the vehicle region detected in step S613 is not irradiated with high beam.

It should be noted that the processing target range calculation unit 212 may be configured to have only the oncoming lane inclusion range calculation unit 313 among the oncoming lane inclusion range calculation unit 313, the oncoming lane opposite side inclusion range calculation unit 314, and the intersecting road inclusion range calculation unit 315, of FIG. 3. Such a configuration can realize a vehicle detection apparatus that detects only the taillight of the preceding vehicle and the headlight of the oncoming vehicle, while reducing processing time. Further, in the specific color region detection unit 211, the detection processing of the yellow region and the green region may be deleted so that detection is limited to detection of the red region. Thereby, the processing time can be further reduced.

The operation of the light distribution control in the configuration in which the processing target range calculation unit 212 includes only the oncoming lane inclusion range calculation unit 313 without having the oncoming lane opposite side inclusion range calculation unit 314 and the intersecting road inclusion range calculation unit 315 will be described below.

Figure 11B:
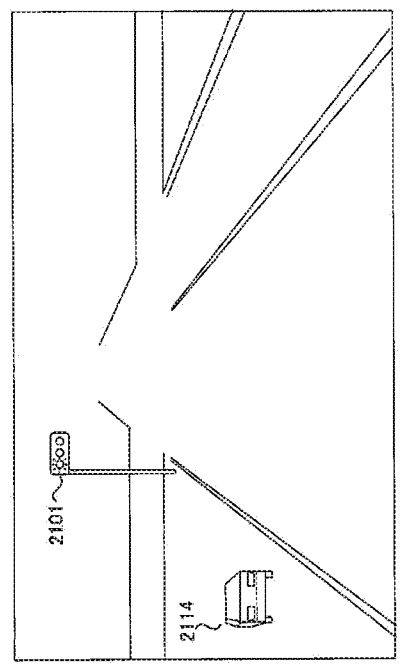

FIG. 11(B) is a drawing showing a situation in which a traffic light 2101 exists in front of the own vehicle and a vehicle 2114 being opposite to the own vehicle exists in a place outside the traveling road of the own vehicle that is on the opposite side of the oncoming lane. In an environment shown in FIG. 11(B), when any of the indicator lamps of the traffic light 2101 is switched from OFF to ON under the situation in which the headlight of the vehicle 2114 is turned ON, since the processing target range set by the processing target range calculation unit 212 is only the region including the oncoming lane, the vehicle 2114 is not detected, and the result of the light distribution control is changed from the low beam to the high beam. Thereafter, when the processing target range is not set by the processing target range calculation unit 212, the entire image is the processing target, and the vehicle 2114 is detected, but the processing time increases and the result of the light distribution control is delayed to set low beam.

The vehicle region detection unit 213 may be configured so as to transmit a control signal to the light distribution control unit 123 at a stage when the detection result of the vehicle region with respect to the range calculated by the oncoming lane inclusion range calculation unit 313 is obtained, and thereafter, further transmit the control signal to the light distribution control unit 123 based on the detection result when the detection result of the vehicle region with respect to the range calculated by the intersecting road inclusion range calculation unit 315 and the oncoming lane opposite side inclusion range calculation unit 314 is obtained. The operation of the light distribution control in this case is as follows. In the environment shown in FIG. 11(B), when any of the indicator lamps of the traffic light 2101 is switched from OFF to ON under the situation that the headlight of the vehicle 2114 is turned ON, the vehicle 2114 is not initially detected and the result of the light distribution control is changed from low beam to high beam. Thereafter, after the vehicle region detection processing with respect to the range calculated by the oncoming lane opposite side inclusion range calculation unit 314 is completed, the operation is switched to the low beam when the vehicle 2114 is detected.

In the above description, the case of the left-hand traffic, that is, when the vehicle travels in the left side lane from the center line has been described. However, the present invention can be applied also to the case of the right-hand traffic, that is, when the vehicle travels in the right side lane from the center line. In this case, by assuming that the left and right are reversed, the vehicle detection apparatus according to the present invention can be realized by the same processing as above.

According to the present embodiment, by detecting a specific color region, calculating a processing target range from the detected specific color region, and detecting the vehicle from the calculated processing target range, the number of pieces of data used for vehicle detection is reduced, which leads to a reduction in processing time.

Second Embodiment

A second embodiment of the present invention will be described below with reference to FIGS. 12 to 14.

Figure 12:
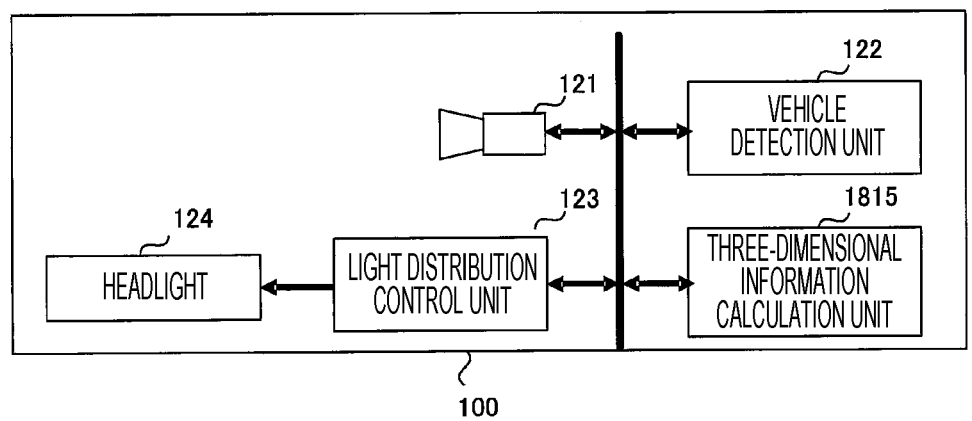
FIG. 12 is a system configuration diagram of a vehicle according to a second embodiment.

FIG. 12 is a system configuration diagram of the vehicle 100 according to the second embodiment of the present invention. The vehicle 100 according to the second embodiment includes the camera 121, the vehicle detection unit 122, the light distribution control unit 123, the headlight 124, and a three-dimensional information calculation unit 1815. Since the vehicle 100 is the same as the first embodiment except for the three-dimensional information calculation unit 1815, the description of the same portions will be omitted below.

The three-dimensional information calculation unit 1815 is for measuring the distance to an object existing in front of the vehicle 100, and is configured by using, for example, a laser radar, a laser range finder, a stereo camera, or the like having a function of measuring forward three-dimensional information. The three-dimensional information calculation unit 1815 may measure three-dimensional information around the vehicle including the front of the vehicle. The three-dimensional information calculation unit 1815 may be composed of one camera, and measure the three-dimensional information, serving as a stereo camera together with the camera 121.

Figure 13:
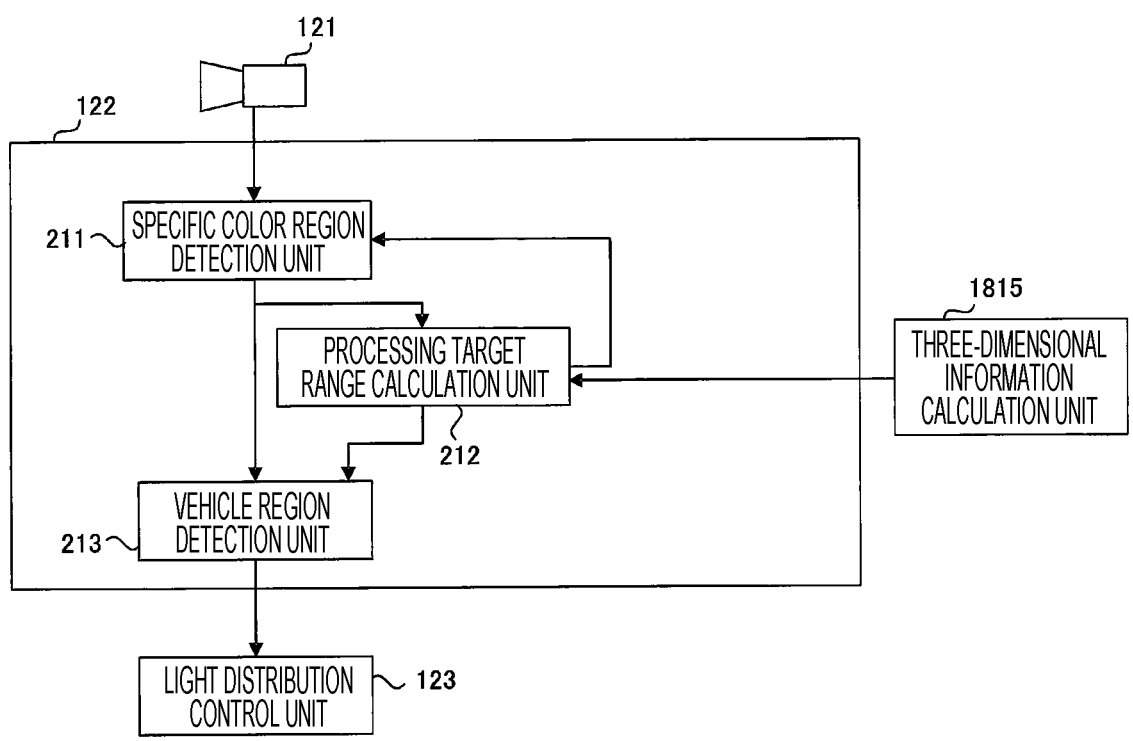
FIG. 13 is a block diagram showing a functional configuration of a vehicle detection unit according to the second embodiment.

FIG. 13 is a block diagram showing a functional configuration of the vehicle detection unit 122. The specific color region detection unit 211, the processing target range calculation unit 212, and the vehicle region detection unit 213 show in the form of the block diagram, functions that are realized by the CPU of the vehicle detection unit 122 executing the processing program stored in the main storage unit or the auxiliary storage unit. The configuration of the vehicle detection unit 122 is the same as that of the first embodiment except that the processing target range calculation unit 212 receives input of three-dimensional information from the three-dimensional information calculation unit 1815. The different features are, in the functional configuration of the processing target range calculation unit 212 shown in FIG. 3, the method of calculating the range including the oncoming lane in the oncoming lane inclusion range calculation unit 313 and the method of calculating the range including the oncoming lane opposite side place in the oncoming lane opposite side inclusion range calculation unit 314. The different features will be mainly described below.

The oncoming lane inclusion range calculation unit 313 according to the second embodiment calculates the region of the road surface with the image photographed by the camera 121 from the three-dimensional information acquired from the three-dimensional information calculation unit 1815, and adds the calculated condition that is the upper side of the road region to the calculation condition of the region including the oncoming lane.

Figure 14A:
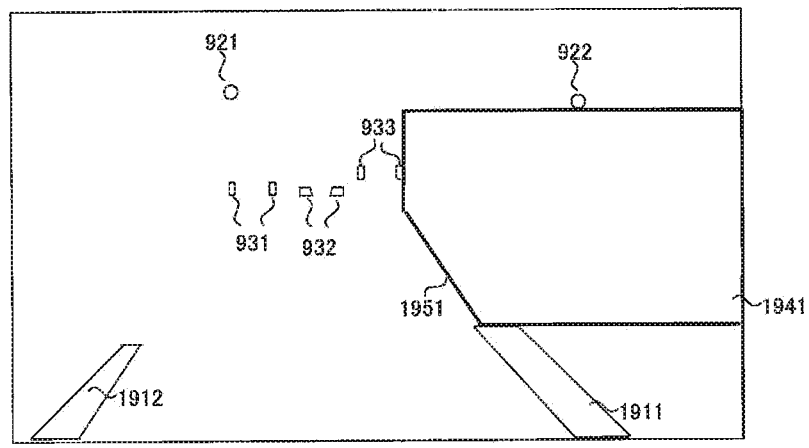
FIGS. 14A and 14B are diagrams showing processing ranges of images according to the second embodiment.
Figure 14B:
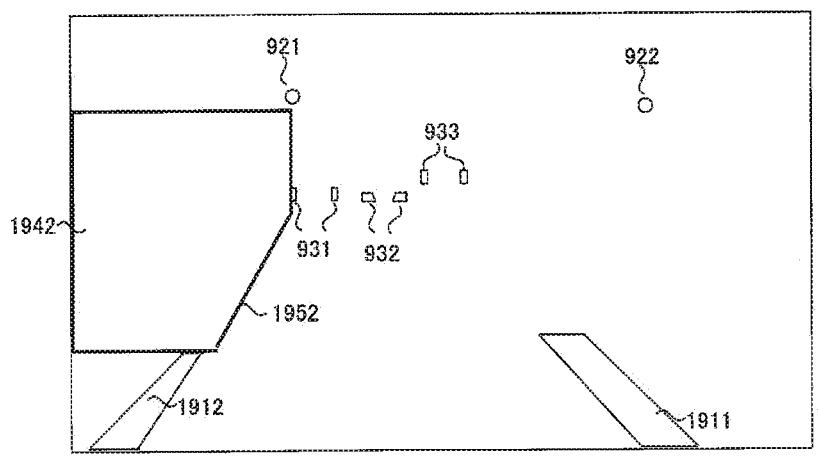

FIGS. 14(A) and 14(B) are diagrams showing the processing ranges of the images according to the second embodiment.

FIG. 14(A) is a diagram showing the range 1941 including the oncoming lane calculated on the basis of the taillight region pairs 931, 932, and 933 of the three preceding vehicles, the two traffic light regions 921 and 922, and distance information, shown in FIG. 8(A). Regions 1911 and 1912 are regions where the three-dimensional information can be acquired and regions determined to be roads from values of the three-dimensional height direction. The range 1941 that covers the upper side of the region determined to be a road from the range 941 shown in FIG. 8(A) is set to be a range including the oncoming lane.

The oncoming lane opposite side inclusion range calculation unit 314 calculates the region of the road surface with the image photographed by the camera 121 from the three-dimensional information acquired from the three-dimensional information calculation unit 1815, and adds the calculated condition that is the upper side of the road region, to the calculation condition of the range including the oncoming lane opposite side place.

FIG. 14(B) is a diagram showing the range 1942 including the opposite side of the oncoming lane calculated on the basis of the taillight region pairs 931, 932, and 933 of the three preceding vehicles, the two traffic light regions 921 and 922, and distance information, shown in FIG. 9(C). Regions 1911 and 1912 are regions where the three-dimensional information can be acquired and regions determined to be roads from values of the three-dimensional height direction. The range 1942 that covers the upper side of the region determined to be a road from the range 1241 shown in FIG. 9(C) is set to be a range including the oncoming lane opposite side place.

According to the present embodiment, the size of the processing target region becomes smaller than in the first embodiment, so that the number of pieces of data used for vehicle detection is suppressed, which leads to a reduction in processing time.

According to the embodiment described above, the following operational effects can be obtained.

(1) The vehicle detection apparatus includes: the specific color region detection unit 211 that detects the specific color region from the image photographed by the camera 121 provided in the vehicle 100; the processing target range calculation unit 212 that calculates the processing target range in which the other vehicle is detected in the image on the basis of the specific color region detected by the specific color region detection unit 211; and the vehicle region detection unit 213 that detects the region of the other vehicle from the image within the processing target range calculated by the processing target range calculation unit 212. As a result, presence of other vehicle can be quickly detected from the photographed image.

In each of the embodiments described above, each component, function, processing unit, processing means, and the like may be realized by hardware, for example, by designing a part or all of them in an integrated circuit, or the like. Each component, function, and the like may be realized by software by interpreting and executing a program that the processor realizes each function. Information such as programs, tables, files, and the like that realize each function can be stored in a storage device such as a memory, a hard disk, or a solid state drive (SSD), or a storage medium such as an IC card, an SD card, or a DVD.

The present invention is not limited to each of the embodiments described above, and various modifications are included. Each of the embodiments described above has been described in detail in order to explain the present invention in an easy-to-understand manner, and the present invention is not necessarily limited to those having all the configurations described in the embodiments. A part of the configuration of an embodiment can be replaced by the configuration of another embodiment. The configuration of another embodiment can be added to the configuration of an embodiment. With respect to part of the configuration of each embodiment, other configurations can be added, deleted, or replaced. Other embodiments considered within the technical idea of the present invention are also included within the scope of the present invention.

The disclosure content of the following priority application is incorporated herein as a quotation.

Japanese Patent Application No. 2016-5063 (filed Jan. 14, 2016)

REFERENCE SIGNS LIST

100 vehicle
121 camera
122 vehicle detection unit
123 light distribution control unit
124 headlight
211 specific color region detection unit
212 processing target range calculation unit
213 vehicle region detection unit
311 preceding vehicle taillight discrimination unit
312 traffic light discrimination unit
313 oncoming lane inclusion range calculation unit 314 oncoming lane opposite side inclusion range calculation unit
315 intersecting road inclusion range calculation unit
316 processing target range parameter setting unit
317 processing range calculation unit for detecting next frame specific color region

The invention claimed is:

1. A vehicle detection apparatus comprising:
a specific color region detection unit that detects a specific color region from an image photographed by a camera provided in a vehicle;
a processing target range calculation unit that calculates a processing target range in which another vehicle is detected in the image based on the specific color region detected by the specific color region detection unit; and
a vehicle region detection unit that detects a region of the other vehicle from the image within the processing target range calculated by the processing target range calculation unit, wherein
the processing target range calculation unit calculates a range including an oncoming lane in a traveling road of the vehicle based on the specific color region, and adds the calculated range including the oncoming lane to the processing target range,
the processing target range calculation unit calculates a range including an intersecting road intersecting the traveling road in front of the vehicle based on the specific color region, and adds the range including the calculated intersecting road to the processing target range,
the processing target range calculation unit sets a priority order for detecting the region of the other vehicle with respect to each of the range including the oncoming lane and the range including the intersecting road, and
the vehicle region detection unit detects the region of the other vehicle from each of the range including the oncoming lane and the range including the intersecting road according to the set priority order.

2. The vehicle detection apparatus according to claim 1, wherein the vehicle region detection unit detects a region of the other vehicle based on a high luminance region within the processing target range in the image.

3. The vehicle detection apparatus according to claim 1, wherein the processing target range calculation unit calculates a range including an oncoming lane opposite side place outside the traveling road on an opposite side of the oncoming lane based on the specific color region, and adds the range including the calculated oncoming lane opposite side place to the processing target range.

4. The vehicle detection apparatus according to claim 1, wherein the processing target range calculation unit calculates a detection target range of the specific color region with respect to a next frame image based on a range including the oncoming lane, and
the specific color region detection unit detects the specific color region from a detection target range of the specific color region of the next frame image.

5. The vehicle detection apparatus according to claim 1, wherein the vehicle detection apparatus further comprises a three-dimensional information acquisition unit that acquires three-dimensional information around the vehicle, and
the processing target range calculation unit calculates a region of a road surface based on the three-dimensional information and the image, and calculates the processing target range based on the region of the road surface and the specific color region.

6. The vehicle detection apparatus according to claim 1, wherein the processing target range calculation unit detects a taillight region of a preceding vehicle from the specific color region, and calculates a range including the oncoming lane based on the detected taillight region.

7. The vehicle detection apparatus according to claim 1, wherein the processing target range calculation unit detects an indicator lamp region of a traffic light from the specific color region and calculates the range including the oncoming lane based on the detected indicator lamp region of the traffic light.

8. The vehicle detection apparatus according to claim 1, wherein the processing target range calculation unit detects a taillight region of a preceding vehicle and an indicator lamp region of a traffic light from the specific color region, and calculates a range including the oncoming lane based on the detected taillight region and the indicator lamp region of the traffic light.

9. The vehicle detection apparatus according to claim 1, wherein the processing target range calculation unit sets different vehicle region detection algorithms for each of the range including the oncoming lane and the range including the intersecting road, and
the vehicle region detection unit detects the region of the other vehicle from each of the range including the oncoming lane and the range including the intersecting road by using the vehicle region detection algorithm that has been set.

10. A light distribution control apparatus that controls light distribution of a headlight of the vehicle based on the region of the other vehicle detected by the vehicle detection apparatus according to claim 1.

* * * * *